No. 819,832. PATENTED MAY 8, 1906.
J. L. WOODBRIDGE.
SYSTEM OF ELECTRICAL DISTRIBUTION.
APPLICATION FILED APR. 19, 1905.
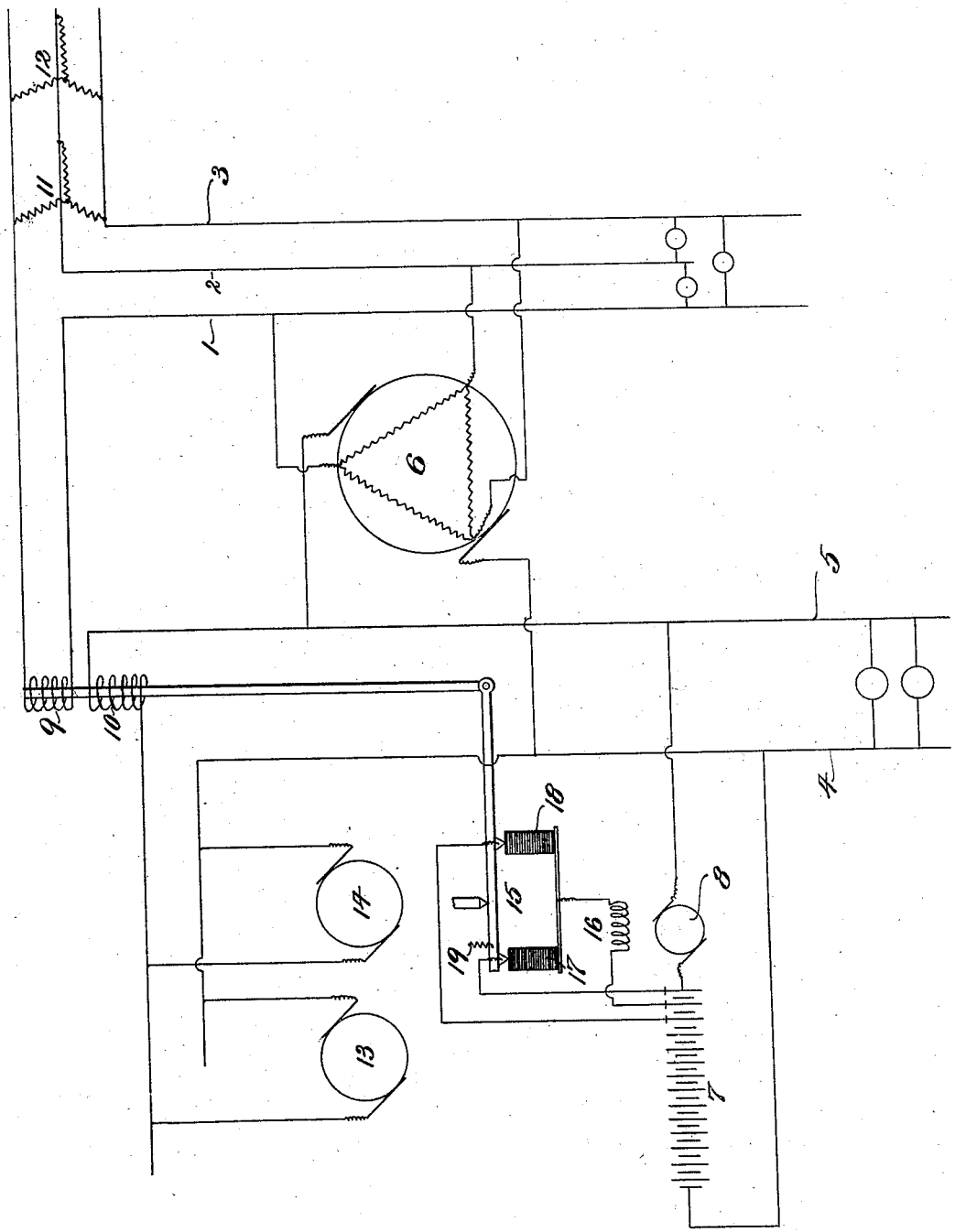

UNITED STATES PATENT OFFICE.

JOSEPH LESTER WOODBRIDGE, OF PHILADELPHIA, PENNSYLVANIA.

SYSTEM OF ELECTRICAL DISTRIBUTION.

No. 819,832.  Specification of Letters Patent.  Patented May 8, 1906.

Application filed April 19, 1905. Serial No. 256,476.

*To all whom it may concern:*

Be it known that I, JOSEPH LESTER WOODBRIDGE, a citizen of the United States, and a resident of Philadelphia, in the county of Philadelphia and State of Pennsylvania, have invented a certain new and useful System of Electrical Distribution, of which the following is a specification.

The principal object of the present invention is to provide for the regulation of combined alternating-current and direct-current loads by means of a storage battery in cases where both kinds of currents are employed in connection with a general distribution system.

To this and other ends, hereinafter set forth, the invention, stated in general terms, comprises the improvements to be presently described and finally claimed.

The nature, characteristic features, and scope of the invention will be more fully understood from the following description, taken in connection with the accompanying drawing, forming part hereof, and in which is illustrated diagrammatically a system of distribution embodying features of the invention.

In the drawing the alternating-current lines 1 2 3 and the direct-current lines 4 5 are connected together through the intervention of the rotary converter 6 or its equivalent. The battery 7 and its booster 8 (which may be appropriately driven) are connected in series across the direct-current lines or bus-bars 4 5. The booster voltage is controlled by means responsive to variations in the alternating-current and direct-current loads.

9 and 10 are solenoids interposed, respectively, in the alternating-current-generator circuit and in the direct-current-generator circuit. The former includes the generators 11 and 12, and the latter includes the generators 13 and 14. These solenoids operate the regulator 15, which in its turn controls the field 16 of the booster, so that the latter is responsive to variations of load on either circuit. The operation of the regulator is fully explained in Letters Patent of the United States numbered 763,168, dated June 21, 1904, granted to Justus B. Entz, and need not be here repeated, as it is well understood.

When the load on either the alternating or direct current circuits, or both, increases, the solenoids 9 and 10 cause pressure to be exerted upon the part 17 and relieves the part 18 of pressure. The result of this is that the field 16 is properly changed in such a way that the battery discharges, whereas if the load on either or both of the two circuits should fall off the solenoids 9 and 10 permit the spring or equivalent 19 to cause pressure to be exerted upon the part 18 and to be relieved on the part 17, so that the field 16 is appropriately changed for causing the battery to charge, and during times of average combined loads on the two circuits the conditions of pressure on the parts 17 and 18 are such that the battery may neither charge nor discharge.

It will be obvious to those skilled in the art to which the invention relates that modifications may be made in details without departing from the spirit thereof. Hence the invention is not limited further than the prior state of the art may require; but,

Having thus described the nature and objects of my invention, what I claim as new, and desire to secure by Letters Patent, is—

1. The combination of alternating and direct current circuits having an appropriate converter operatively connected between them, a battery and booster, operatively arranged in respect to the direct-current circuit, a booster-regulator, and solenoids interposed in the generator-circuits of the direct and alternating systems and operatively arranged in respect to the booster-regulator, substantially as described.

2. The combination of alternating and direct current circuits having an appropriate converter operatively connected between them, a battery and booster operatively arranged in respect to the direct-current circuit, and a booster-regulator responsive to variations of the load on either circuit, substantially as described.

3. The combination of alternating and direct current circuits having an appropriate converter operatively connected between them, a battery operatively arranged in respect to the direct-current circuit, and means adapted to cause the battery to charge and discharge and operatively arranged to respond to variations of load on either circuit, substantially as described.

In testimony whereof I have hereunto signed my name.

J. LESTER WOODBRIDGE.

Witnesses:
W. J. JACKSON,
K. M. GILLIGAN.